March 29, 1955     C. O. LE GRAND     2,704,948
POWER CHAIN SAW SHARPENER

Filed May 5, 1953     4 Sheets-Sheet 1

Fig. 1.

INVENTOR.
Charles O. Le Grand
BY
Bacon & Thomas
ATTORNEYS

March 29, 1955

C. O. LE GRAND 2,704,948

POWER CHAIN SAW SHARPENER

Filed May 5, 1953

INVENTOR.
Charles O. LeGrand
BY
Bacon & Thomas
ATTORNEYS

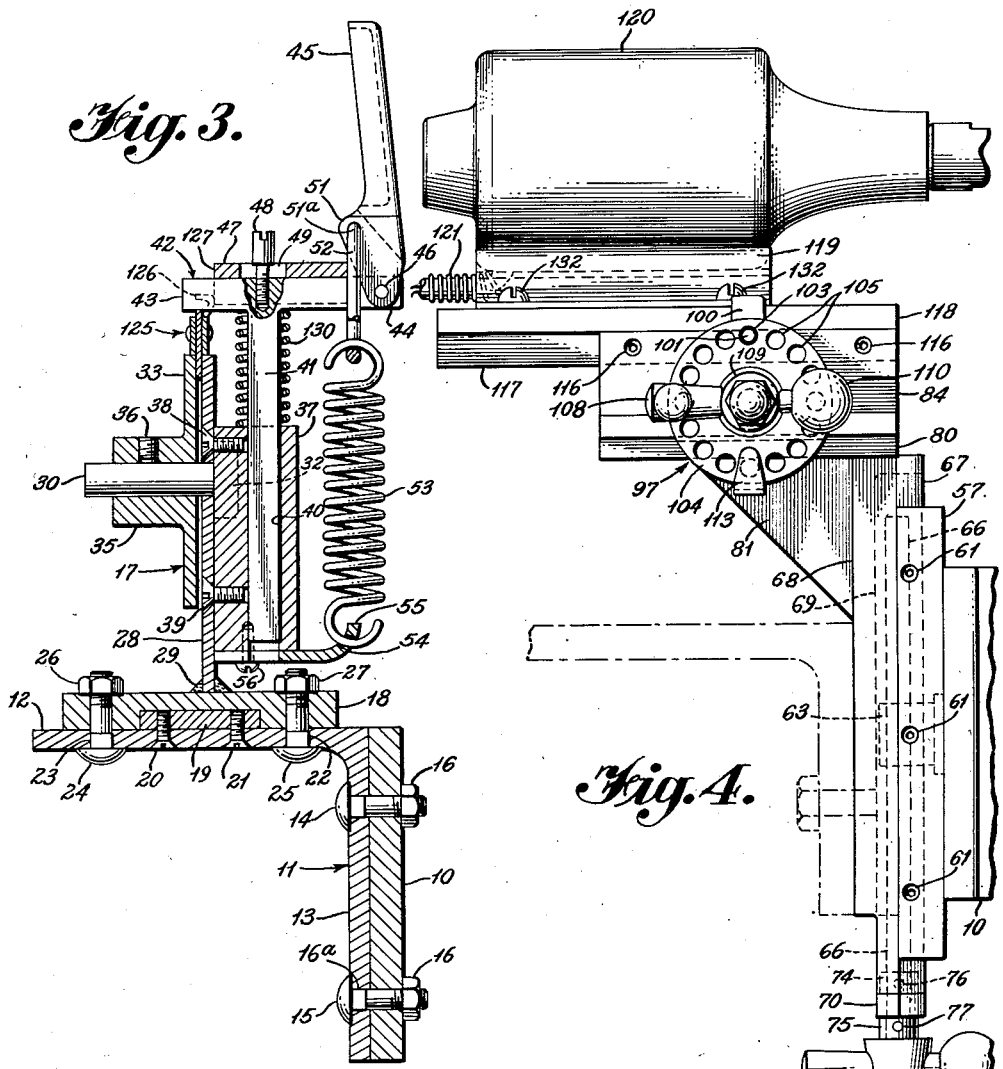
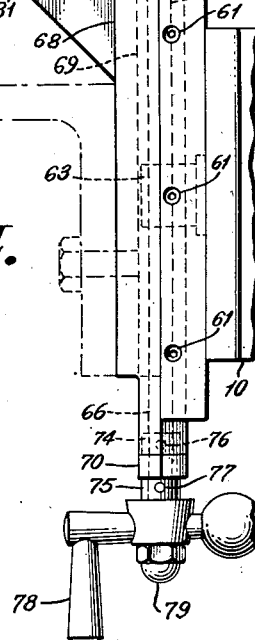
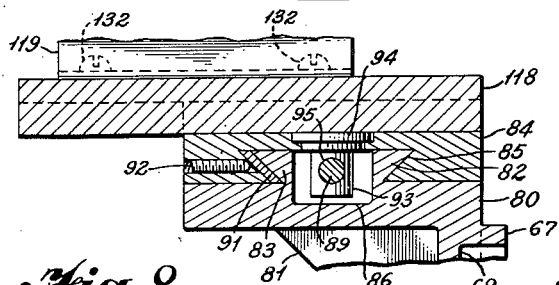

March 29, 1955 C. O. LE GRAND 2,704,948
POWER CHAIN SAW SHARPENER
Filed May 5, 1953 4 Sheets-Sheet 4
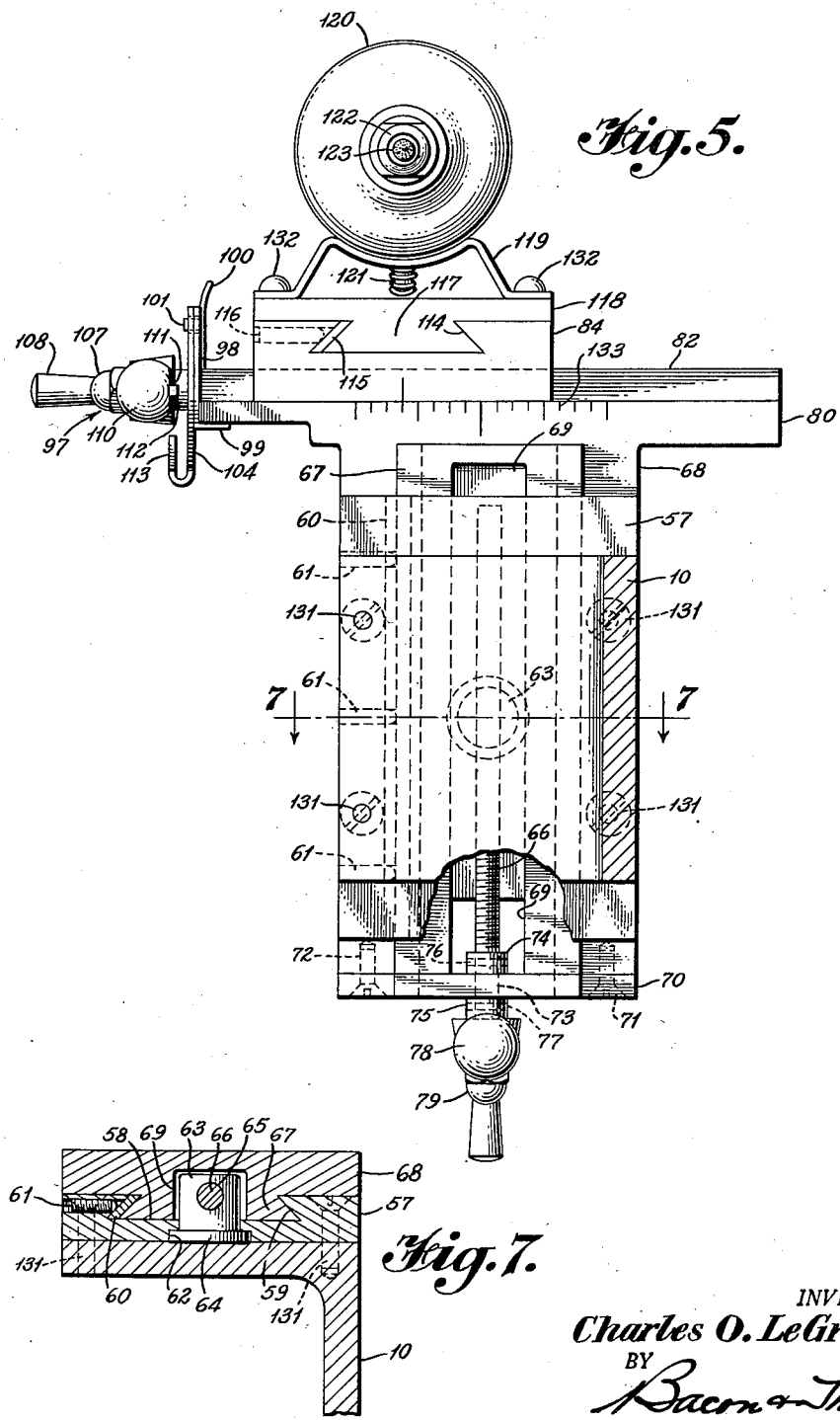
INVENTOR.
Charles O. LeGrand
BY
ATTORNEYS

United States Patent Office 2,704,948
Patented Mar. 29, 1955

2,704,948

POWER CHAIN SAW SHARPENER

Charles O. Le Grand, Grants Pass, Oreg.

Application May 5, 1953, Serial No. 353,135

5 Claims. (Cl. 76—41)

This invention relates to a power device for sharpening chain saws and more particularly relates to a precision machine to joint and sharpen chain saw teeth.

Chain saws of the chipper type have heretofore been sharpened by hand through the use of special saw clamping and file guiding devices. Such manual sharpening has usually resulted in somewhat uneven work and has entailed an excessive amount of labor and time. In addition to such manual methods of sharpening there have also been attempts to provide satisfactory power sharpeners. These machines have been relatively complicated and comprised of numerous moving and adjustable parts. The gauging, jointing and sharpening operations were performed separately and each involved a manual adjustment, setting and operation of various movable parts of the machine. Such numerous adjustments and movements made a positive setting of the various parts difficult to maintain and creeping and loss of adjustment was common under the vibratory effect of the power means. Devices of this type have normally utilized an axial feed of the high speed grinder which has resulted in uneven grinder wear with a resulting tendency to sharpen the teeth unevenly as the work progresses from tooth to tooth.

It is an object of this invention to provide a power chain saw sharpener which is capable of both jointing and sharpening chain saws of the chipper type.

It is another object of this invention to provide a chain saw sharpener of the aforementioned type which will both joint and sharpen the chipper teeth simultaneously without entailing adjustments beyond those necessary to move the grinding tool.

It is a further object of this invention to provide a power chain saw sharpener which is capable of jointing the cutting gauges on all types of chain saws which use a cutting gauge.

It is a still further object of this invention to provide such a power chain saw sharpening device which is relatively simple in operation, comprised of relatively few moving parts, and is a precision instrument.

It is a still further object of this invention to provide a power chain saw sharpener having adjustments which will remain set despite the normal vibration of the power means.

Further objects and advantages of the invention will become apparent upon reference to the following specification and drawings wherein:

Figure 1 is a plan view of the device;

Figure 3 is a vertical cross-section of the saw clamping mechanism taken on the line 3—3 of Figure 2;

Figure 4 is a side elevation of the power feed and indexing mechanism showing the vertical feed adjustment;

Figure 5 is an elevation, partly in section, of the power means taken on the line 5—5 of Figure 1;

Figure 7 is a cross-section of the vertical feed device taken on the line 7—7 of Figure 5; and Figure 8 is a vertical section of the horizontal power feed taken on the line 8—8 of Figure 6.

Figure 2:
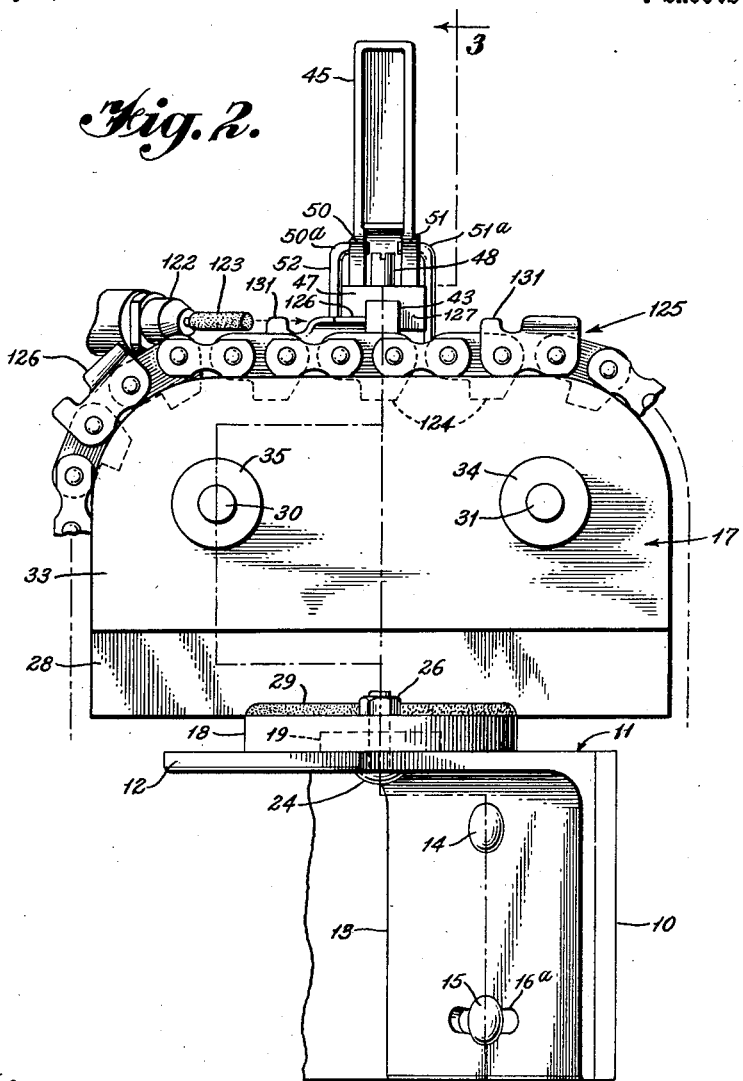
Figure 2 is a side elevation of the saw clamping sub-assembly taken on the line 2—2 of Figure 1.

Referring more particularly to the figures of the drawing, the numeral 10 designates an L-shaped standard which is mounted by any conventional means, not shown, to a table or work bench or other means of support. Attached to one vertical face of the long leg of said L-shaped standard is a tilting bracket 11 which comprises a horizontal table section 12 and a vertical support section 13 which is mounted on the standard 10 by means of two bolts 14 and 15 which are made fast by nuts 16 on the other side of the leg of the standard. An aperture in the support section 13 receives the lower bolt 15 and consists of an arced slot 16$^a$ which makes it possible to pivot the tilting bracket 11 about the upper bolt 14. By providing the desired length of slot 16$^a$ any desired amount of tilt may be obtained.

Mounted upon the upper surface of table section 12 is the saw clamping sub-assembly indicated generally at 17. This sub-assembly consists of a swivel base 18 which is carried on the face of table section 12 and is centered thereon by means of a pivot member 19 secured to the table section by means of screws 20 and 21. Concentrically arranged around pivot member 19 are arcuate slots 22 and 23 (best seen in Figure 1) which are cut through table section 12 to receive fastening bolts 24 and 25. Bolts 24 and 25 pass through apertures in the rotatable base 18 and are releasably secured thereto by means of nuts 26 and 27. By loosening nuts 26 and 27 it is possible to rotate the saw clamping sub-assembly about the pivot 19.

A vertical support plate 28 is welded diametrically across the rotatable base 18 at 29 and has fastened thereto a pair of studs 30 and 31 which extend horizontally and parallelly outwardly from such support plate. Studs 30 and 31 are secured to the support plate in any conventional manner such as by welding stud heads 32 to the plate. Parallel to support plate 28 and having a top edge contiguous therewith is a clamping plate 33 having a pair of bushings 34 and 35 for slidably receiving the studs 30 and 31. Each bushing 34 and 35 has mounted therein a set screw 36 for fastening the clamping plate securely to studs 30 and 31.

On the other side of vertical support plate 28 and centrally located between studs 30 and 31 is a vertical guideway 37, see Figure 3, which is fastened to plate 28 by means of countersunk screws 38 and 39. Slidably mounted within a vertical slot 40 in guideway 37 is the square vertical stem 41 of a T-shaped locking bar 42. The horizontal portion of the T-shaped locking bar comprises a clamping arm 43 which extends toward and over the parallel edges of the vertical plate 28 and clamping plate 33. Said T-shaped clamping bar further comprises a tension arm 44 which extends in the opposite direction to the clamping arm 43 and this tension arm has a lever 45 pivotally mounted thereon by means of a pin 46. Surrounding vertical stem 41 and engaging arms 43 and 44 and the upper surface of guideway 37 is a coil spring 130 which urges the locking bar 42 upwardly. Straddling the upper arms of clamping bar 42 is an inverted U-shaped saddle 47 which is slidably mounted on said locking bar and is fastenable thereto by means of a set screw 48 mounted in locking bar 42. The saddle has arranged therein an elongated slot 49 which receives the set screw 48 and the length of the slot determines the amount of possible adjustment of saddle 47. The lever 45 has on its underside a pair of projections 50 and 51 which receive the inturned ends 50$^a$ and 51$^a$ of a clasp 52 which supports the upper end of a coil spring 53. The lower end of coil spring 53 is hooked through an aperture 54 in a fastening bracket 55 which is attached to the lower end of guideway 37 by means of screw 56.

Attached to the short leg of L-shaped standard 10 by means of screws 131 is a vertical bedplate 57 having a vertical slot 58 cut therethrough, see Figures 1 and 7. The walls 59 of slot 58 are slopped inwardly in the conventional manner and one wall has mounted adjacent thereto a gib 60 for use in controlling the slidability of the key 67 sliding through the slot 58. Such adjustment is made by means of gib screws 61 which are set into the bedplate 57. Centrally located in slot 58 approximately midway between the ends of bedplate 57 is a recessed aperture 62 which receives a shouldered stud 63 having a flange 64. The outer end of stud 63 is pierced by a threaded aperture 65 to receive a feed screw 66.

Slidably mounted within the slot 58 is a key 67 which is an integral part of the vertical motor support pedestal 68. The key 67 and pedestal 68 have a longitudinal slot 69 extending substantially the full length thereof for receiving the stud 63. Across the lower face of pedestal 68 is mounted a bearing plate 70 which is attached to the pedestal by means of screws 71 and 72. The feed screw 66 is threaded through stud 63 and passes through a centrally located bearing 73 in a cross-member 70. A pair of collars 74 and 75 is attached to feed screw 66 on either side of bearing plate 70 by means of pins 76 and 77. The outermost end of feed screw 66 has mounted thereon a crank 78 which is locked thereon by means of a nut 79. Rotation of the crank 78 causes vertical movement of the pedestal 68.

Integrally attached to the top of pedestal 68 is a horizontal bed 80 which is supported by means of an angle bracket 81. Integrally extending upwardly from bed 81 are a pair of angular keys 82 and 83 for receiving a motor support block 84 having a keyway 85 cooperating with keys 82 and 83. Centrally located between angular keys 82 and 83 is an elongated slot 86 which extends from adjacent the end 87, see Figure 1, of bed 80 to the other end 88 thereof. Into this slot extends a feed screw 89 which passes through an aperture 90 in the end 87 of bed 80. Between one side of keyway 85 and key 83 is located a gib 91 adjustable by means of a gib screw 92 mounted in the motor support block 84. Centrally located in motor support block 84 is a shouldered stud 93 having a flange 94 located at one end thereof. The projecting end of stud 93 carries a threaded aperture 95 for the reception of feed screw 89.

On the end 87 of bed 80 is located the horizontal feed indexing means, shown generally at 97, which consists of a circular vertical plate 98 having at its bottom portion an inturned lip 99 which engages the under surface of the end 87 of bed 80. Between plate 98 and the end of bedplate 80 is secured a detent spring 100 having a detent 101 mounted thereon. The detent 101 passes through an aperture 102 in plate 98 and through a further aperture 103 in a plate 104 mounted parallel to and adjacent plate 98. Plates 98 and 104 are both circular in shape, are both centered on feed screw 89 and both contain matching concentrically located circumferential apertures 105 similar to apertures 102 and 103. Plates 104, 98 and detent spring 100 are secured to the end 87 of bed 80 by means of a collar 105 on the outer end of feed screw 89 and by a collar 106 located in the slot 86 adjacent the other side of end 87. Collars 105 and 106 are secured by any suitable means to feed screws 89 and prevent movement of the feed screw in an axial direction. Mounted on the outer end of feed screw 89 by means of a lock nut 107 is a crank 108. Attached to the hub 109 of crank 108 is a ball-shaped extension 110 having two complementary notches 111 and 112, see Figure 5, located on the underside thereof. The lower edge of circular plate 104 carries thereon an upturned stop 113 which engages the notches 111 and 112. The plate 98 is prevented from rotating about feed screw 89 by means of lip 99, whereas the plate 104 is prevented from rotating about feed screw 89 by means of the detent 101 which locks plate 104 to plate 98. When plates 98 and 104 are thus locked together, it is possible to rotate feed screw 89 through only one revolution due to the engagement of slots 111 and 112 with the stop 113. Full rotatability of crank 108 and feed screw 89 is achieved by depressing the detent 100 to the right, as seen in broken lines in Figure 6, so that plate 104 may rotate relative to plate 98.

Mounting block 84 has arranged therein an elongated slot 114 containing a gib 115 which is adjusted by means of set screws 116. Mounted in such slot 114 is a key 117 which is an integral part of motor base 118. Attached to motor base 118 by means of legs 119 and screws 132 is a reversible high speed motor 120, having a power lead 121 and having mounted on its shaft a chuck 122 which carries a circular grinding tool 123. The motor base 118 is horizontally slidable in slot 114.

The operation of the device is as follows:

Set screws 36 in studs 34 and 35 are loosened and clamping plate 33 is moved a sufficient distance away from vertical plate 28 to allow the tongues 124 of a chipper type chain saw 125 to be slidably received between clamping plate 33 and vertical plate 28. When plate 33 is adjusted to this position, set screws 36 are locked to retain it in this setting. The chain saw 125 is then slid along the edge of plates 33 and 28 until the back of a tooth 126 contacts a vertical face of clamping arm 43 on clamping bar 42. When the chain reaches this position, the lever 45 is pivoted in a counterclockwise direction to reach the position shown in Figure 3. In this position the coil spring 53 is extended and the clamping bar 42 and clamping arm 43 are forced downwardly with the underside of clamping arm 43 locking the chain 125 against the upper edge of plates 33 and 28. Set screw 48 in the top of clamping bar 42 is then loosened so that saddle 47 may be slid into position with its outer edge 127 contacting the side of the chipper tooth 126. The tooth 126 is now firmly clamped into position and is ready for grinding.

The swivel base 18 is then rotated to the proper angular position, as is dictated by the angle desired on the chipper teeth, usually around 45°, by loosening nuts 26 and 27 and then tightening the same to lock the swivel base 18 in position. The position of swivel base 18 is then noted on the scale 128. The motor and grinding tool 123 are then moved to the proper side of swivel base 18 by depressing detent spring 100 to the right and rotating crank 108 until the motor and tool are in the proper position as indicated in Figure 1. The motor and tool 123 are then manually moved toward tooth 126 and the height of the tool is adjusted by means of crank 78. The motor 120 is then turned on and the grinding stone 123 worked slowly into the throat of the tooth 126. The adjustment of crank 108 should be such at this time that the grinding stone does not contact the tooth. The crank 108 is then rotated to force the stone against the throat of the tooth and the indexing means 97 consisting of plates 104 and 98 and detent spring 100 are then set so that at the final grinding position, one of the notches 111 or 112 engages the stop 113. At this point the detent 101 will be in the position shown in full lines in Figure 6.

Whereas the figures of the drawing show the motor and tool as being in a horizontal position, it will be recognized that certain chain saws have teeth so shaped that the grinding tool must operate on an angle to the horizontal and when this is the case, the tilting bracket 13 is rotated about bolt 14 to achieve the proper angle.

After the tooth 126 has been faced in the foregoing manner, the crank 108 is rotated one revolution until the unengaged notch contacts the stop 113. This moves the grinding tool 123 perpendicularly away from the face of the tooth 126 so that the tool may be withdrawn by manually sliding the motor in slot 114. The lever 45 is then rotated in a clockwise direction to release clamp bar 42 and to allow it to rise under the urging of coil spring 130 and the next tooth having a similar angle is then slid along plates 33 and 28 until its rear end is in position to contact the side of the clamping arm 43 on clamping bar 42. When this position is reached, the lever 45 is again rotated in a clockwise direction and the foregoing grinding procedure repeated. In this instance, the crank 108 is rotated until the stop 113 engages the notch and when this occurs the tool 123 will be a distance from the clamping arm 43 precisely equal to the distance it occupied relative to that arm when the preceding tooth was faced. Thus, all of the alternate teeth on the saw may be faced and an accurate cut assured through the same steps which advance the grinding tool into the tooth. When the teeth are of the type having an inclination to the horizontal from the cutting edge to the rear edge, this precise adjustment of the cut will also accurately joint the teeth because the height of such teeth will depend upon the length of the tooth from cutting edge to rear edge.

After alternate teeth of the saw have been sharpened and jointed in the foregoing manner, the lever 45 is actuated to raise the clamping bar 42, the chain is reversed in plates 28 and 33 and a tooth having an opposite angle is slid along plates 33 and 28 until its rear end contacts the other side of clamping arm 43. The swivel base 18 is then loosened through release of nuts 26 and 27 and is rotated to assume an angle equal to the original angle on the opposite side of the index mark O on scale 128. Such adjustment is made by having noted the original angle of swivel base 18 on the scale 128 and then merely adjusting the base to the same angle on the other side of the index mark. The swivel base is then clamped in this position.

Figure 6:
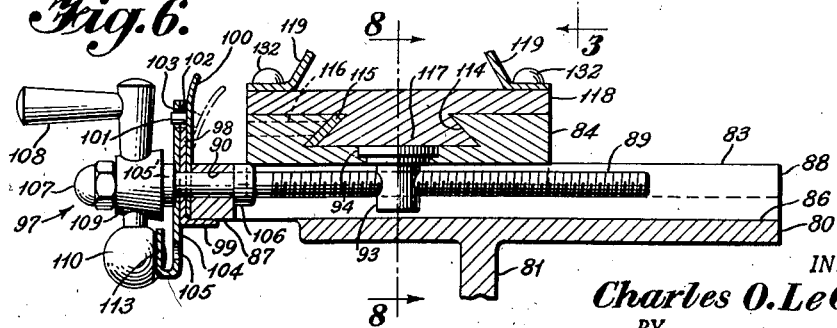
Figure 6 is a cross-section of the horizontal feed and indexing device for the power means and is taken on the line 6—6 of Figure 1.

Detent spring 100 is then depressed to the right, as in the broken lines seen in Figure 6, and crank 108 is rotated to move the motor and grinding tool 123 to the other side of the center of swivel base 13, the proper position being accurately determined by reference to scale 130. The motor is moved until the index indicates that the tool is located a distance on the other side of the center of the swivel equal to its original distance from the center of the swivel. The direction of rotation of the motor is reversed and the foregoing procedure as to the adjustment and feeding of tool 123 is then repeated until all of the chipper teeth on the saw have been sharpened.

With those chain saws having cutting gauges such as 131, in Figure 1, such gauges may be jointed by locking the tooth in position as shown with tooth 126 in Figure 1 and then vertically adjusting the tool 123 by means of crank 78 so that the desired height of cutting gauge 131 will be obtained after the grinding operation. The tool 123 is then manually moved axially across the chain between the cutting gauge 131 and the adjacent tooth 126 as seen in Figure 2 and the grinding commenced by rotation of crank 108 to move the rotating tool 123 across the upper face of the cutting gauge to joint the same. The lever 45 is then rotated in a clockwise direction to unlock the chain and the next cutting gauge is slid into position and the procedure repeated.

It will be readily appreciated that with the device of this invention it is possible to accurately sharpen and joint teeth of the chipper type and to joint cutting gauges solely by the steps of feeding the grinding tool without the necessity of independent gauging or measuring.

Whereas, this invention has been defined in terms of specific apparatus elements and combinations, this has been for the purpose of illustration only and should not be deemed limiting in any sense, the invention being limited only by the scope and spirit of the appended claims.

I claim:

1. A saw sharpening device comprising in combination; a standard, a saw clamping means pivotally fastened to said standard about a horizontal axis, said clamping means being rotatable about an axis lying in a perpendicular plane, a pedestal mounted on said standard so as to be vertically adjustable thereon, a support block slidably mounted on said pedestal so as to be slidable in a horizontal direction, a horizontal feed screw rotatably mounted in said pedestal and screw threadedly engaging a nut fixed to said support block, a crank on said feed screw for rotating said screw and horizontally moving said block, index means rotatably mounted on said feed screw for engaging a portion of said crank so as to prevent said crank rotating a full revolution relative to said index means, lock means fixed to said pedestal for releasably locking said index means to said pedestal, a motor base slidably attached to said support block so as to be slidable in a horizontal plane perpendicular to said feed screw, and a grinding tool equipped motor mounted on said motor base.

2. A saw sharpening device comprising in combination; a standard, a saw clamping means pivotally fastened to said standard about a horizontal axis, said clamping means being rotatable about an axis lying in a perpendicular plane, a pedestal mounted on said standard so as to be vertically adjustable thereon, a support block slidably mounted on said pedestal so as to be slidable in a horizontal direction, a horizontal feed screw rotatably mounted in said pedestal and screw threadedly engaging a nut fixed to said support block, a crank on said feed screw for rotating said screw and horizontally moving said block, an apertured locking plate mounted on said pedestal perpendicular to said feed screw, an index plate rotatably mounted on said feed screw parallel and contiguous to locking plate, a series of apertures in said index plate arranged in a circle around said feed screw, said apertures being so situated as to be alignable with the aperture in said locking plate, a stop on said index plate engageable with a portion of said crank, a detent means mounted on said pedestal to withdrawably pass through the aperture in said locking plate and the aligned aperture in said index plate, a motor base slidably attached to said support block so as to be slidable in a horizontal plane perpendicular to said feed screw, and a grinding tool equipped motor mounted on said motor base.

3. A saw sharpening device as set forth in claim 2 wherein said saw clamping means comprises; a pair of parallel plates having a pair of contiguous and parallel edges, studs mounted on a first of said plates and extending perpendicularly therefrom through mating bushings in the other of said plates, a guideway attached to an outer side of one of said plates and having a vertical slot therein adjacent said outer side, a T-shaped locking bar having a vertical stem slidably mounted in said slot, one of the cross arms of said T-shaped locking bar extending over and perpendicular to said pair of parallel edges, the other cross arm of said T-shaped locking bar extending in the opposite direction from said one cross arm, and means mounted on said other cross arm for yieldably moving said one arm into engagement with a chain saw arranged between said parallel edges.

4. A saw sharpening device comprising in combination; a saw clamping means tiltable about a horizontal axis and rotatable about an axis lying in a plane perpendicular to said horizontal axis, said saw clamping means comprising, a pair of parallel plates having a pair of contiguous and parallel edges, studs mounted on a first of said plates and extending perpendicularly therefrom through mating bushings in the other of said plates, a guideway attached to an outer side of one of said plates and having a vertical slot therein adjacent said outer side, a T-shaped locking bar having a vertical stem slidably mounted in said slot, one of the cross arms of said T-shaped locking bar extending over and perpendicular to said pair of parallel edges, the other cross arm of said T-shaped locking bar extending in the opposite direction from said one cross arm, means mounted on said other cross arm for yieldably moving said one arm into engagement with a chain saw arranged between said parallel edges, a motor driven grinding tool mounted adjacent said clamping means, vertical adjusting means to raise and lower said grinding tool relative to said clamping means, horizontal adjusting means to move said grinding tool horizontally relative to said clamping means, and means to move said grinding tool in a direction normal to said horizontal movement.

5. A saw sharpening device comprising in combination; a saw clamping means tiltable about a horizontal axis and rotatable about an axis lying in a plane perpendicular to said horizontal axis, said saw clamping means comprising, a pair of parallel plates having a pair of contiguous and parallel edges, studs mounted on a first of said plates and extending perpendicularly therefrom through mating bushings in the other of said plates, a guideway attached to an outer side of one of said plates and having a vertical slot therein adjacent said outer side, a T-shaped locking bar having a vertical stem slidably mounted in said slot, one of the cross arms of said T-shaped locking bar extending over and perpendicular to said pair of parallel edges, the other cross arm of said T-shaped locking bar extending in the opposite direction from said one cross arm, a lever pivotally mounted on the extremity of said other cross arm, a coil spring attached at one end to a point intermediate the ends of said lever and attached at the other end to a bracket secured to a lower portion of said guideway, a coil spring surrounding said stem of said T-shaped locking bar and having its upper end in contact with the undersides of said cross arms and its lower side in contact with an upper surface of said guideway, a motor driven grinding tool mounted adjacent said clamping means, vertical adjusting means to raise and lower said grinding tool relative to said clamping means, horizontal adjusting means to move said grinding tool horizontally relative to said clamping means, and means to move said grinding tool in a direction normal to said horizontal movement.

References Cited in the file of this patent

UNITED STATES PATENTS

| Number | Name | Date |
| --- | --- | --- |
| 437,929 | King | Oct. 7, 1890 |
| 1,488,056 | Orr | Mar. 25, 1924 |
| 1,850,331 | Ohler | Mar. 22, 1932 |
| 2,318,456 | Blum | May 4, 1943 |
| 2,410,828 | Lofstrand, Jr. | Nov. 12, 1946 |
| 2,453,638 | Nietfeld | Nov. 9, 1948 |
| 2,568,062 | Fitch | Sept. 18, 1951 |
| 2,589,165 | Toy et al. | Mar. 11, 1952 |